Figure 1:
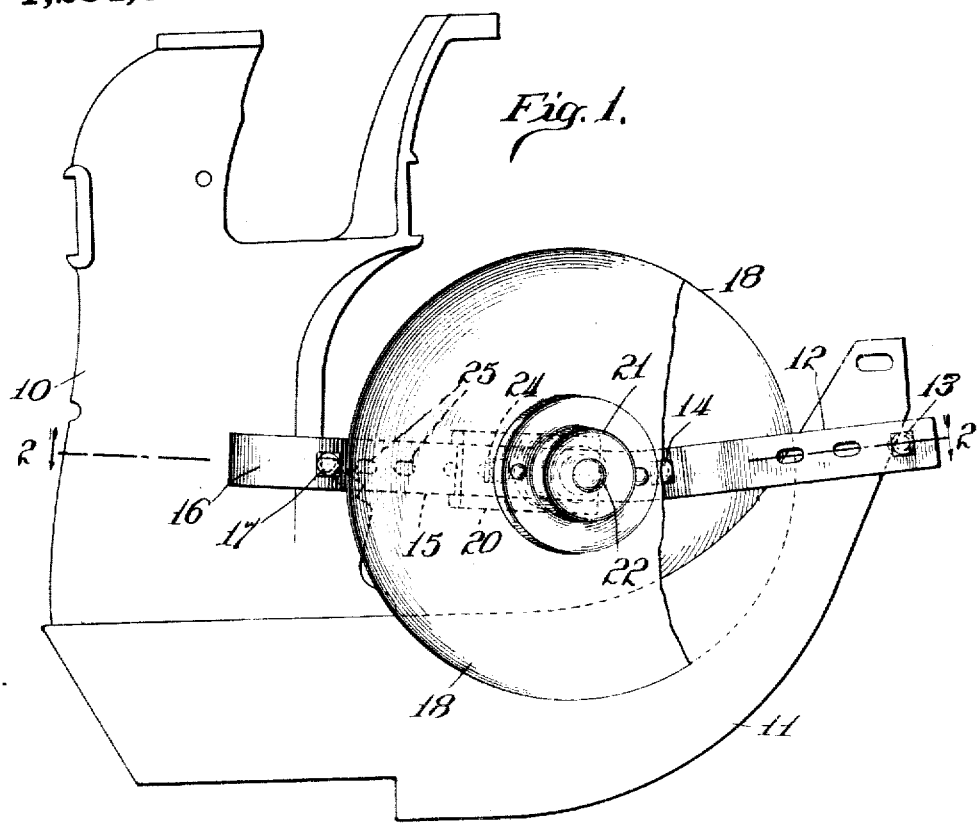

E. E. ENGLUND.
MEANS FOR ATTACHING DISKS TO PLANTERS.
APPLICATION FILED JULY 8, 1918.

1,284,626.

Patented Nov. 12, 1918.

Witness
Milton Lenoir

Inventor
Ernst E. Englund
Adams & Jackson
Attorneys

UNITED STATES PATENT OFFICE.

ERNST E. ENGLUND, OF MOLINE, ILLINOIS, ASSIGNOR TO D. M. SECHLER IMPLEMENT & CARRIAGE COMPANY, OF MOLINE, ILLINOIS, A CORPORATION OF ILLINOIS.

MEANS FOR ATTACHING DISKS TO PLANTERS.

1,284,626.  Specification of Letters Patent.  Patented Nov. 12, 1918.

Application filed July 6, 1918. Serial No. 243,570.

*To all whom it may concern:*

Be it known that I, ERNST E. ENGLUND, a citizen of the United States, and a resident of Moline, in the county of Rock Island and State of Illinois, have invented certain new and useful Improvements in Means for Attaching Disks to Planters, of which the following is a specification, reference being had to the accompanying drawings.

This invention relates to seed-planting machines and has for its object to provide improved means for adjustably securing a pair of rearwardly-diverging furrow-opening devices alongside of and connected with the usual curved runner and its hollow shank, thereby making provision for readily changing the spacing apart of such devices so as to vary the width of furrows as desired. This object I attain by the means shown in the drawings and hereinafter particularly described. That which I believe to be novel will be set forth in the claims.

In the drawings:—

Figure 2:
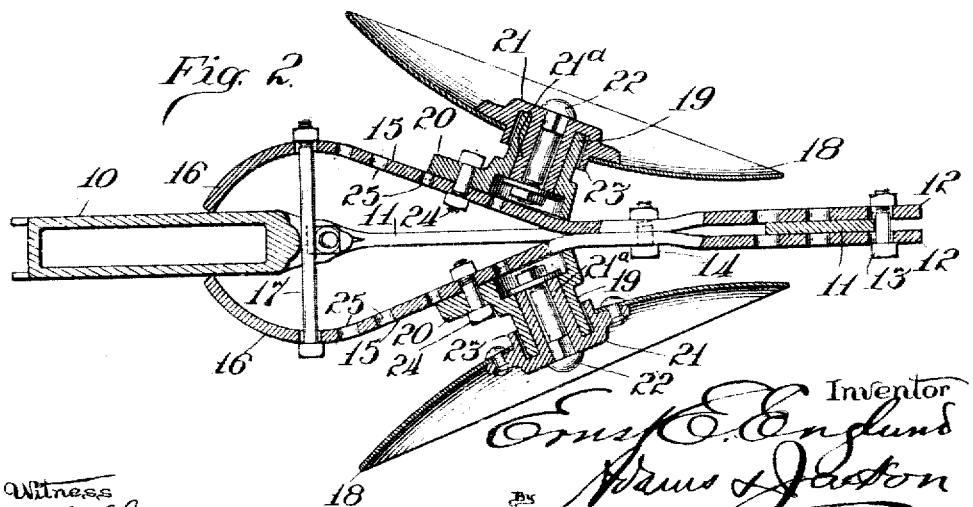

Figure 1 is a side elevation of a hollow runner and its shank to which a pair of reversely-inclined disks are adjustably secured by my improved means, one of such disks being partly broken away; and Fig. 2 is a cross section taken at line 2—2 of Fig. 1.

Referring to the drawings:—

10 indicates a hollow shank adapted to be connected at its upper end as usual with the frame of a corn-planter, and when such machine is of the two-row type a shank and the parts connected therewith and hereinafter referred to will be employed, of course, at each side of the front frame. In each shank will be provided mechanism for controlling the passage of seed through the shank from the time it is received from the usual hopper with which the shank communicates. Such controlling mechanism may well be of the kind forming the subject matter of Letters Patent No. 1,216,788, dated February 20, 1917, granted upon my application. Such controlling mechanism and the means for operating it form no part of the present invention and therefore are not here illustrated or described. Projecting forwardly from the lower end of the shank is a curved runner 11 of the usual type adapted to form a narrow trench for the reception of the seeds that are delivered through the shank.

12 indicates two similar bars arranged opposite each other and supported against opposite sides of the said shank 10 and its runner 11, each of said bars having adjustably secured to it, as hereinafter more particularly described, one of the said inclined disks. The forward portions of these bars lie alongside of the upturned forward portion of the runner and are firmly clamped to such runner. As shown such clamping is effected by a bolt 13 that passes through the end portions of the bars that project beyond the runner and by a bolt 14 that passes through the bars and draws them closely together at a point some little distance in rear of the inner or rear edge of the runner. In rear of the bolt 14 the bars are respectively bent outward to provide two straight and rather sharply-diverging portions, indicated by 15, and are then bent inwardly toward each other to form two curved portions, indicated by 16. The ends of these curved portions 16 bear against opposite sides of the shank 10. 17 indicates a bolt passing through the bars 12 at substantially that point where they are farthest apart—being approximately at the point where the portions 15 and 16 of each bar merge into each other. By tightening the nut on this bolt 17 the rear ends of the curved portions 16 of the bars will be forced and held very firmly against the sides of the shank.

18 indicates two disks carried by the bars 12 respectively, each disk being rotatably secured to a hollow cylindrical boss 19 formed with a block 20 which is movably attached to the outer face of the diagonal portion 15 of one of the bars 12. As shown, the disk has a small plate 21 attached centrally of its outer face, with which is formed an elongated hub 21ª that projects through the disk and is journaled in the hollow boss 19, being secured therein by a bolt 22, the nut therefor being located in a recess in the inner face of the block, as shown. A collar 23 formed on the inner face of the plate 21 surrounds the outer end of the boss. By the construction briefly outlined each disk will be rotatably connected with its block 20.

Each of such blocks fits against the outer face of its bar 12 and is aided in being held thereon by flanges formed at its sides that overlie the edges of the bar, and each block is independently adjustable along the portion 15 of its bar. As shown, it is secured in different adjusted positions by means of a bolt 24 passing through the block and through any one of a series of holes 25 in the bar, but, obviously, instead of such series of holes a slot may be provided.

By my invention two ground-opening implements, such as the pair of disks in the construction shown, can be readily applied at opposite sides of the shank and runner of an ordinary planter when the same are needed or desired. In so applying them it will only be necessary to remove the bolt 13 and loosen the bolt 14 sufficiently to allow the forward portions of the bars 12 to be pushed into place at opposite sides of the upper part of the runner. At the same time—and with the bolt 17 loosened somewhat—the curved rear ends of the bars will be placed in position against the sides of the shank. Thereafter a tightening of the three bolts 13, 14, and 17 by a turning of their respective nuts will tend to draw the bars together and clamp between them very firmly the runner and shank. It will be noted that with the parts arranged as shown the forward bolt 13 will come in contact with the front curved edge of the runner; this location is of advantage in that it tends to counteract any tendency of the disks to rise due to their pressure against the earth when the planter is in operation. I prefer to provide, as shown, a plurality of holes in the forward portions of the bars for the reception of the bolt 13, as provision is thereby made for better adapting the bars to different shapes and makes of runners and also permitting the bolt 13 to be located in contact with the runner's forward edge when the disks are clamped in a lower position than shown in Fig. 1, for it is to be borne in mind that by reason of the novel attaching means shown and described the disks can at any time, and with but very little trouble, be adjusted up and down on the shank and runner, or with respect to either the shank or runner, to regulate the depth of furrow.

By reason of the adjustability of the blocks 20 along the diagonal portions 15 of the bars, the disks can be set farther from or closer to each other to make a furrow of the desired width.

The fact that only one bolt needs to be entirely removed when applying the pair of disks to or removing them from a machine is of very considerable advantage in that the two bars and their respective disks may at all times be kept together by the other bolts, and consequently the two bars and their disks will be considered and handled as a single attachment.

What I claim as my invention and desire to secure by Letters Patent, is:—

1. In a planter, the combination with a hollow shank for the passage of seed, a runner extending from said shank and provided with an upturned forward end portion, a pair of bars secured against opposite sides of said shank and upturned end portion and bridging the space between said parts, each of said bars having a rearwardly-inclined portion, blocks slidingly secured upon such inclined portions, and a disk rotatably mounted upon each block.

2. The combination with the shank and runner of a planter, of two bars extending between said parts and secured respectively against opposite sides of the shank and runner, said bars diverging rearwardly from a point in rear of the upper part of the runner, and a ground-opening device mounted upon the diverging portion of each bar.

3. The combination with the shank and runner of a planter, of two bars extending between said parts and secured respectively against opposite sides of the shank and runner, said bars diverging rearwardly from a point in rear of the upper part of the runner, and a ground-opening device mounted upon the diverging portion of each bar, said ground-opening device being movable longitudinally of such diverging portions of the bars.

4. The combination with the shank and runner of a planter, of two bars each comprising a substantially straight portion at one end, an intermediate outwardly-inclined portion and an inwardly-turned portion at its other end, means for securing the first-named portions of the bars against opposite sides of said runner and securing the second-named end portions against opposite sides of said shank, and a ground-opening device connected with the said intermediate portion of each bar.

5. The combination with the shank and runner of a planter, of two bars each comprising a substantially straight portion at one end, an intermediate outwardly-inclined portion and an inwardly-turned portion at its other end, means for drawing said bars toward each other to cause them to clamp between them at their said end portions respectively the said runner and shank, and a ground-opening device connected with the said intermediate portion of each bar.

6. The combination with the shank and runner of a planter, of two bars each comprising a substantially straight portion at one end, an intermediate outwardly-inclined portion and an inwardly-turned portion at its other end, means for drawing said bars toward each other to cause them to clamp between them at their said end portions respectively the said runner and shank, and a ground-opening device connected with the said intermediate portion of each bar, said ground-opening devices being movable longitudinally of such intermediate portions.

7. The combination with the shank and runner of a planter, of two bars each comprising a substantially straight portion at one end, an intermediate outwardly-inclined portion and an inwardly-turned portion at its other end, means for drawing said bars toward each other to cause them to clamp between them at their said end portions respectively the said runner and shank, and a ground-opening device connected with the said intermediate portion of each bar, said means for drawing the bars together comprising a plurality of bolts, the forward one of which lies adjacent to the front edge of the runner.

ERNST E. ENGLUND.

Copies of this patent may be obtained for five cents each, by addressing the "Commissioner of Patents, Washington, D. C."